Patented May 8, 1945

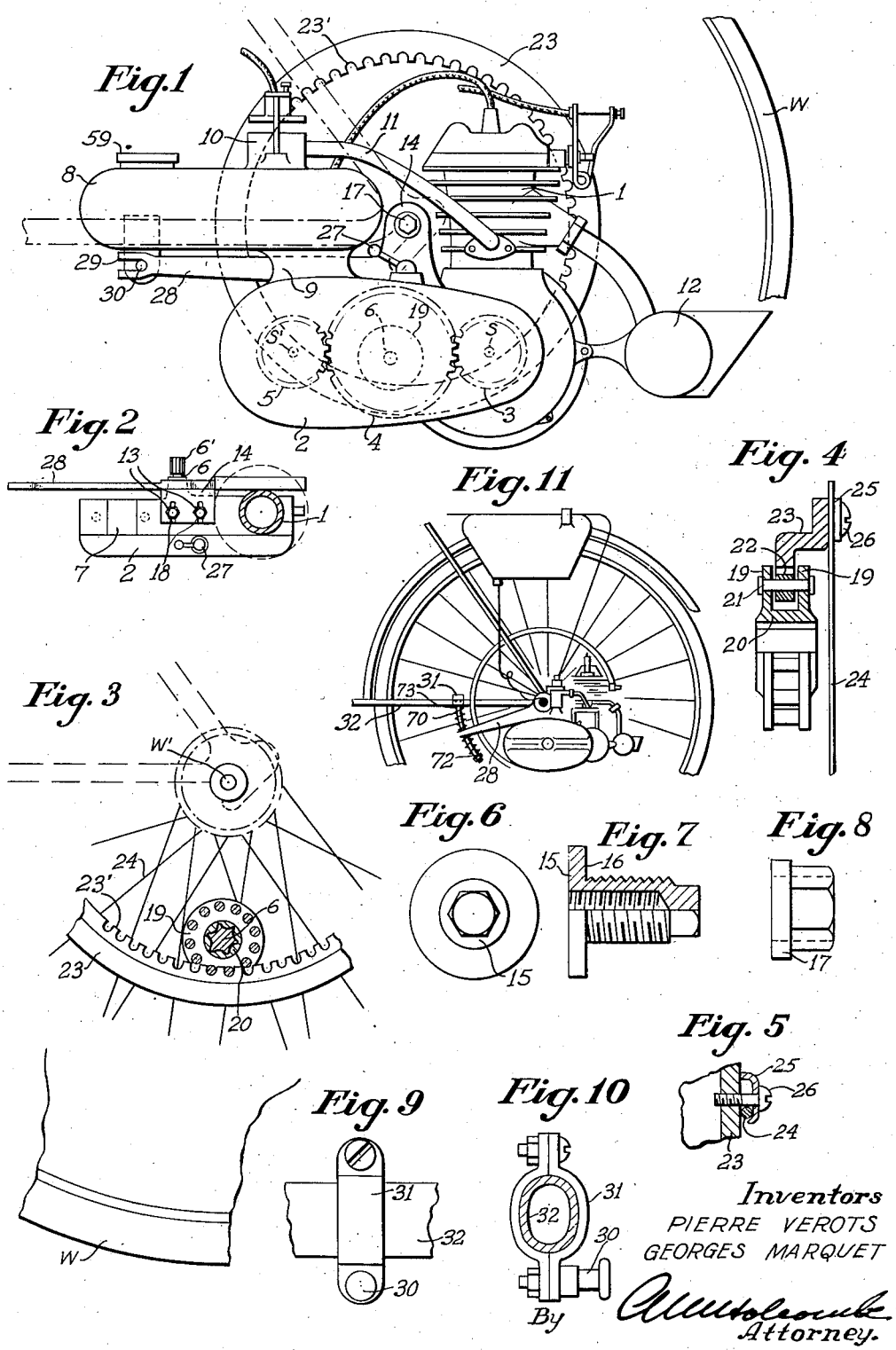

2,375,508

UNITED STATES PATENT OFFICE 2,375,508

REMOVABLE DRIVING EQUIPMENT FOR CYCLES AND CYCLES PROVIDED THEREWITH

Pierre Vérots, Villeurbanne, and Georges Marquet, Lyon, France; vested in the Alien Property Custodian Application May 21, 1942, Serial No. 443,970
In France November 19, 1940

4 Claims. (Cl. 180—33)

This invention relates to a removable driving equipment capable of being applied to bicycles and other cycles so as to convert the same into light motor cycles. By the expression "driving equipment" is usually meant an assembly comprising an engine and a few accessories such as carburetter, ignition device, gear case and the like.

One object of the invention is to provide an equipment adapted to be instantly mounted on a bicycle of the usual type and also quickly removed therefrom, in such a manner that the cyclist may, at will, either make use of it or leave it for using the bicycle in the usual manner.

Another object is to provide an equipment of reduced weight and bulk which will not strain the frame.

A further object is to provide an engined cycle of reduced weight and having good efficiency both when driven by the engine or through the usual pedals.

Still other objects of the invention will appear from the following description of a preferred embodiment thereof.

In the annexed drawing:

Fig. 1 is a general side view of an embodiment of an equipment according to the invention.

Fig. 2 is a corresponding plan view, the petrol tank being omitted and the engine cylinder being shown in section.

Fig. 3 is a fragmentary side view of the rear wheel of the bicycle, showing the driving rim and the pinion straddling over said rim, said pinion being shown in section.

Fig. 4 is a longitudinal sectional view of said pinion and rim.

Fig. 5 is a sectional detail of the rim in a plane at right angles to one of the spokes of the wheel, so as to show the securing means.

Fig. 6 is an end view of the flange nut on which the equipment is to be secured.

Fig. 7 is a part sectional side view of said flange nut.

Fig. 8 is a side view of the external nut adapted to be screwed on said flange nut.

Figs. 9 and 10 are respectively side and end views of the reaction clip secured to the horizontal fork of the bicycle.

Fig. 11 shows a modified embodiment.

The assembly shown in Fig. 1 comprises an engine proper 1, of the two-cycle type in the illustrated instance, the crank case of which is fast with another case 2 containing three intermeshing gears 3, 4 and 5, the first of which is mounted on the shaft S of the engine 1, the second of which is mounted on a shaft 6 which protrudes rearwards of Fig. 1, as will be apparent from the plan view of Fig. 2, and the third of which is mounted on the shaft S' of an ignition device 7 (Fig. 2), secured to a base fast with the case 2. The assembly comprises further a petrol tank 8 with its plug 59, the whole being carried by a supporting arm 9 secured to the case 2 by means of suitable bolts, not shown. The tank 8 carries a carburettor 10, which communicates with the engine 1 through an intake tube 11. Lastly, the engine 1 carries an exhaust pot 12 fast with the whole of the described assembly.

The whole assembly is secured by means of two bolts 13 (Fig. 2) to a square angle-like fastening lug 14 to be attached to the spindle of the rear wheel W, having the shaft W'. In view of this attachment, instead of the usual nut securing the spindle to the frame of the bicycle, there is provided a special nut 15 (Figs. 6 and 7) which is in the shape of a sleeve provided with an external screw thread and with an end flange or collar 16. This nut 15, which may remain permanently on the bicycle, since the normal use of the latter is not hindered thereby, receives the lug 14, which is clamped against the flange 16 by means of a supplementary nut 17 (Fig. 8).

As will be apparent from Fig. 2, the lug 14 is provided with elongated slots 18 through which the bolts 13 are adapted to pass, so as to permit of adusting the assembly axially of the shaft W'.

The part of the shaft 6 which protrudes from the case 2 is provided with splines 6' and is adapted to receive a pinion, which has been omitted in Fig. 2 but details of which are shown in Figs. 3 and 4. Said pinion consists of two cheeks 19, fast with a common splined hub 20, said cheeks carrying fixed pins 21 supporting rollers 22 which are loose thereon, the whole forming thus a lantern pinion with rotatable pins. The pinion 19—20—21—22 gears with an inner set of teeth 23' provided on a rim 23 attached to the rear wheel W, the cheeks 19 straddling over the said set of teeth (Fig. 4) for maintaining axially the pinion on its shaft 6.

The rim 23 is attached to the rear wheel W through the medium of the spokes thereof, each spoke 24 (Fig. 5) being clamped underneath a small clamp 25, made of pressed sheet metal and tightened by a screw 26, the spoke being moreover maintained between the stem of the screw 26 and a turned down flange of the clamp 25.

Between the gear 4 (Fig. 1) and its shaft 6 (Fig. 2) is preferably provided a claw-clutch of any suitable type, such as a sliding dog collar clutch the slide collar of which may be operated from the outside by means of a small handle, such as 27 (Figs. 1 and 2). This device permits of the bicycle being rolled freely when it is provided with the driving equipment and the latter is not in running condition.

The lug 14 is extended forwardly by an arm 28 terminating in a fork 29. The latter is adapted to engage with a flange stud 30 (Figs. 1, 9 and 10) which is one of the bolts used for permanently fastening a clip 31 to the horizontal fork 32 of the cycle. The engine assembly is thus retained in position and is prevented from turning round the rear spindle even in case the nut 17 would have not been sufficiently tightened.

It will be apparent that the engine can be removed when desired by simply taking off the nut 17, without it being necessary to tamper either with the pipings or with the transmission, since the pinion 19—20—21—22 will then be disengaged from the shaft 6 and thereafter removed from the rim 23 on which it remains resting.

It will thus be apparent that the invention provides means to convert quickly a bicycle into a light motor cycle by screwing a single nut, viz the nut 17, the driven cycle differing from an ordinary cycle only by the provision of the rim 23 (which may be made very light in weight by using light alloys) and of the small and hardly visible clip 31.

Referring to Fig. 11, the arm 28 forming an extension of the engine support is connected with the limb 32 of the horizontal fork of the bicycle rear wheel by means of a semi-elastic coupling. For this purpose, this arm 28 terminates in a perforated lug sliding along a curved rod 70 which is secured to the clip 31 and maintained in position by two counteracting springs 72 and 73 coiled around said rod on either side of the arm 28.

These springs serve as a suspension damper and damp the vibrations which are thus prevented from being transmitted to the frame.

Further, as shown in the same figure, the petrol tank 8 is located at a higher level than the engine block and is removably hooked, by means of bolts, to the rear luggage carrying bracket of the machine.

Obviously, the foregoing description is not to be construed as limiting in any manner the ambit of the invention, as the described details thereof may be replaced by any equivalent means without departing from the spirit of the invention. While all the arrangements shown and described co-operate to carry out an improved driving assembly affording the above-mentioned advantages, some of these arrangements might be omitted or replaced by others affording the same general results.

What we claim is:

1. In driving equipment for a cycle, the combination of a bracket adapted to be removably mounted on the spindle of a traction wheel of the cycle; an arm extending from said bracket and provided on its end with a fork; a stud mounted on the frame of the cycle and received in said fork; a casing depending from said bracket, driving means carried by said casing; and means actuated by said driving means adapted to rotate said traction wheel.

2. In driving equipment for a cycle, the combination of a ring gear mounted concentrically on one of the traction wheels of the cycle; a bracket removably mounted on the spindle of said wheel; a driven shaft supported by said bracket parallel with the shaft of said wheel, and adjustable axially of said wheel shaft; a pinion splined on said driven shaft for movement axially thereof and adapted to mesh with said gear, when the driven shaft is in any one of its adjusted positions; and means for driving said driven shaft.

3. In driving equipment for a cycle, the combination of a ring gear mounted concentrically on one of the traction wheels of the cycle; a lantern pinion meshing with said ring gear, and provided with a pair of peripheral cheeks loosely embracing the periphery of said ring gear; a driven shaft on which said pinion is slidably splined; a bracket removably mounted on the spindle of said wheel; supporting means for said shaft mounted on said bracket, and adjustable axially of said pinion; and means mounted on said supporting means for driving said shaft.

4. In driving equipment for a cycle, the combination of a casing; a motor carried by said casing and having a driving shaft journaled in said casing; a driven shaft journaled in said casing and operatively connected with said driving shaft; a plate having a pair of slots; a pair of headed bolts disposed through said slots and received in said casing, their heads bearing on said plate, whereby the casing is secured to and depends from said plate; an upstanding flange on said plate, having an orifice therein; a nut adapted to secure the spindle of a traction wheel of the cycle to the frame of the cycle, said nut having a threaded sleeve received through said orifice; a second nut co-operating with said sleeve to fasten said plate flange on said first mentioned nut; a pinion on said driven shaft; and a ring gear concentrically mounted on said traction wheel, and meshing with said pinion.

PIERRE VÉROTS.
GEORGES MARQUET.